(No Model.)
J. U. LLOYD.
DEVICE FOR EVAPORATING LIQUIDS.
No. 406,453. Patented July 9, 1889.
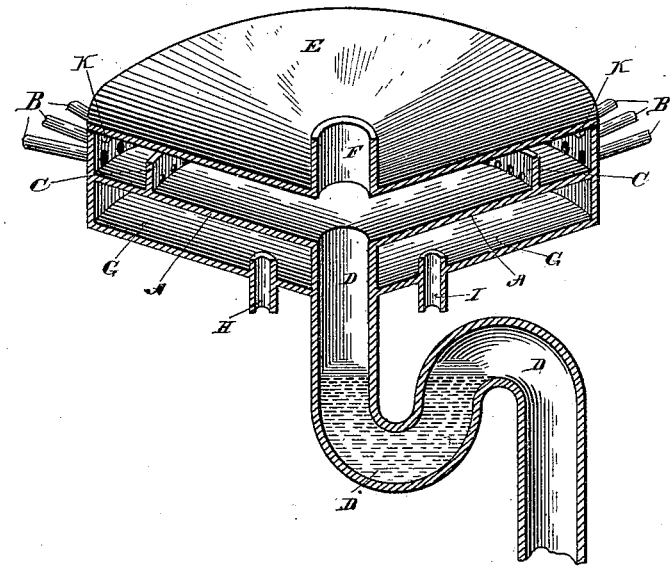

UNITED STATES PATENT OFFICE.

JOHN URI LLOYD, OF CINCINNATI, OHIO.

DEVICE FOR EVAPORATING LIQUIDS.

SPECIFICATION forming part of Letters Patent No. 406,453, dated July 9, 1889.

Application filed December 11, 1888. Serial No. 293,278. (No model.)

*To all whom it may concern:*

Be it known that I, JOHN URI LLOYD, of Cincinnati, in the county of Hamilton and State of Ohio, have invented certain new and useful Improvements in Devices for Evaporating Liquids and Solutions; and I do hereby declare that the following is a full, clear, and exact description of the invention, which will enable others skilled in the art to which it appertains to make and use the same, reference being had to the accompanying drawing, and to letters of reference marked thereon, which form a part of this specification.

My present invention relates to improvements in devices for the evaporation, concentration, or distillation of liquids and solutions, the object being to provide an apparatus that will be simple, compact, and inexpensive in its construction, and which will produce a large amount of evaporation with the smallest expenditure of heat and the least change in the nature of the liquid concentrated.

To these ends my improvements consist, essentially, of a funnel-shaped plate or inclined surface provided with an exit-pipe and with one or more supply-pipes for the liquid that is to be treated, said plate being adapted to receive a removable lid or cover having an opening, preferably in the center, for connection with a suction-pump or blast-fan for conveying a current of air over the liquid during the process of evaporation, all as will be hereinafter fully described, and specifically designated in the claim.

In the accompanying drawing, the figure illustrated represents a vertical section of an apparatus embodying the essential features of my invention.

Referring to the said drawing, the letter A represents the funnel-shaped plate over which the liquid to be evaporated is allowed to flow. It is provided with one or more supply-pipes B and with an inner flange C, having numerous perforations $a$, by means of which the liquid is evenly supplied over the said plate A. The lower end of the said funnel-shaped plate terminates with an exit-pipe D, bent in the shape of a goose-neck, so that the air to supply the suction, as described farther on, cannot enter through the said exit-pipe.

E represents a lid or cover, which is preferably removable, so as to allow of cleansing the apparatus. It is provided with an opening F for connection with a suction-pump or blast-fan, while around the outside of the pan are provided numerous holes K for the escape or entrance of the air.

A suitable steam-space G is provided beneath the plate A for heating the same, said space having openings H and I for the admission of steam and the discharge of water of condensation; but, if desired, direct fire-heat or heated water, sand, oil, or other means may be employed instead of steam.

In the drawing, the plate A is represented as funnel-shaped or inversely conical. It may, however, be inversely square, pyramidal, or simply a plain inclined surface, or other desired form. It is shown in the drawing as flat and smooth; but it may be corrugated, fluted, or furnished with a helically-arranged ribbon-plate.

The lid or cover E is represented in the drawing as inversely conical; but it may be square or even conical in form, and may be varied in respect to its distance from the plate A in accordance with the nature of the liquid to be evaporated.

In the operation of my improved apparatus the liquid to be evaporated enters at the pipes B and is evenly distributed by means of the perforated flange C over the surface of the heated plate A. At the same time a current of air is sucked or blown through the opening F, passing over the surface of the heated liquid and carrying off the resultant vapor. Either air or air mixed with gas may be employed.

By means of this improved apparatus, which is of simple construction, I am enabled to conduct evaporation rapidly and with little expenditure of heat. The liquid is not subjected to continual heat, and the product is not deteriorated or discolored. The apparatus is specially adapted to condensing solutions of sugar, salt, and glucose, but may be applied to any purpose where it is desirable to reduce the bulk of liquid.

Having thus described my invention, I claim as new and desire to secure by Letters Patent—

In an apparatus for evaporating or concentrating liquids or solutions, the funnel-shaped plate A, having the upper part thereof provided with supply-pipes B, perforated flange C, and openings K, and the lower portion thereof with outlet-pipe D, and means for heating said plate, in combination with the removable lid or cover E, having opening F for the passage of a current of air over the surface of the moving liquid, substantially as and for the purpose specified.

In testimony whereof I affix my signature in presence of two subscribing witnesses.

JOHN URI LLOYD.

Witnesses:
GEO. W. CARMANY,
C. DE CROES.